United States Patent [19]

McWilliams

[11] 3,837,510

[45] Sept. 24, 1974

[54] METHOD OF LOADING BAGGED MAIL FROM A LOADING DOCK INTO A HIGHWAY VEHICLE

[76] Inventor: Joseph E. McWilliams, 1345 Canterbury Ln., Glenview, Ill. 60025

[22] Filed: July 17, 1972

[21] Appl. No.: 272,477

Related U.S. Application Data

[62] Division of Ser. No. 108,500, Jan. 21, 1971, Pat. No. 3,717,263.

[52] U.S. Cl................ 214/152, 198/122, 198/125, 214/6 D, 214/41
[51] Int. Cl.......................................... B65g 57/11
[58] Field of Search ........ 214/6 D, 6 DK, 6 G, 6 P, 214/38 R, 40, 41; 198/119, 121, 122, 123, 124, 125

[56] References Cited
UNITED STATES PATENTS

| | | | |
|---|---|---|---|
| 1,617,490 | 2/1927 | Knox.................................. | 198/125 |
| 1,717,876 | 6/1929 | Davis.................................. | 198/125 |
| 2,632,556 | 3/1953 | Alpens et al..................... | 198/121 X |
| 2,703,653 | 3/1955 | Thomson.......................... | 214/6 G |
| 2,971,631 | 2/1961 | Gray.................................. | 198/119 |
| 3,169,630 | 2/1965 | Christiansen.................... | 198/119 X |
| 3,416,674 | 12/1968 | Goalandris et al............... | 214/6 DK |
| 3,581,874 | 6/1971 | Keith................................. | 198/121 |

FOREIGN PATENTS OR APPLICATIONS

| | | | |
|---|---|---|---|
| 1,020,205 | 2/1966 | Great Britain..................... | 214/6 G |
| 961,241 | 6/1964 | Great Britain..................... | 198/119 |
| 612,553 | 11/1948 | Great Britain..................... | 198/119 |
| 647,325 | 10/1962 | Italy.................................... | 214/6 G |

*Primary Examiner*—Robert J. Spar
*Assistant Examiner*—Leslie J. Paperner
*Attorney, Agent, or Firm*—Mann, Brown, McWilliams & Bradway

[57] ABSTRACT

The invention relates to the loading of mail bags from a loading dock into an end loading highway vehicle to fully load the vehicle with mail bags, in which a mail bag handling conveyor is provided with a single bar width conveyor section carried by and extending longitudinally of a wheeled frame. The conveyor section projects cantilever fashion from the forward end of the frame, which is supported at its forward end by a swingably mounted leg that is movable between lowered and upright positions to vary the elevation of the discharging forward end of the conveyor section. The conveyor section is swingably connected to the frame at its rearward end, and its forward end rests on a slide bar arrangement for shifting from side to side to facilitate bag stacking or piling.

1 Claim, 16 Drawing Figures

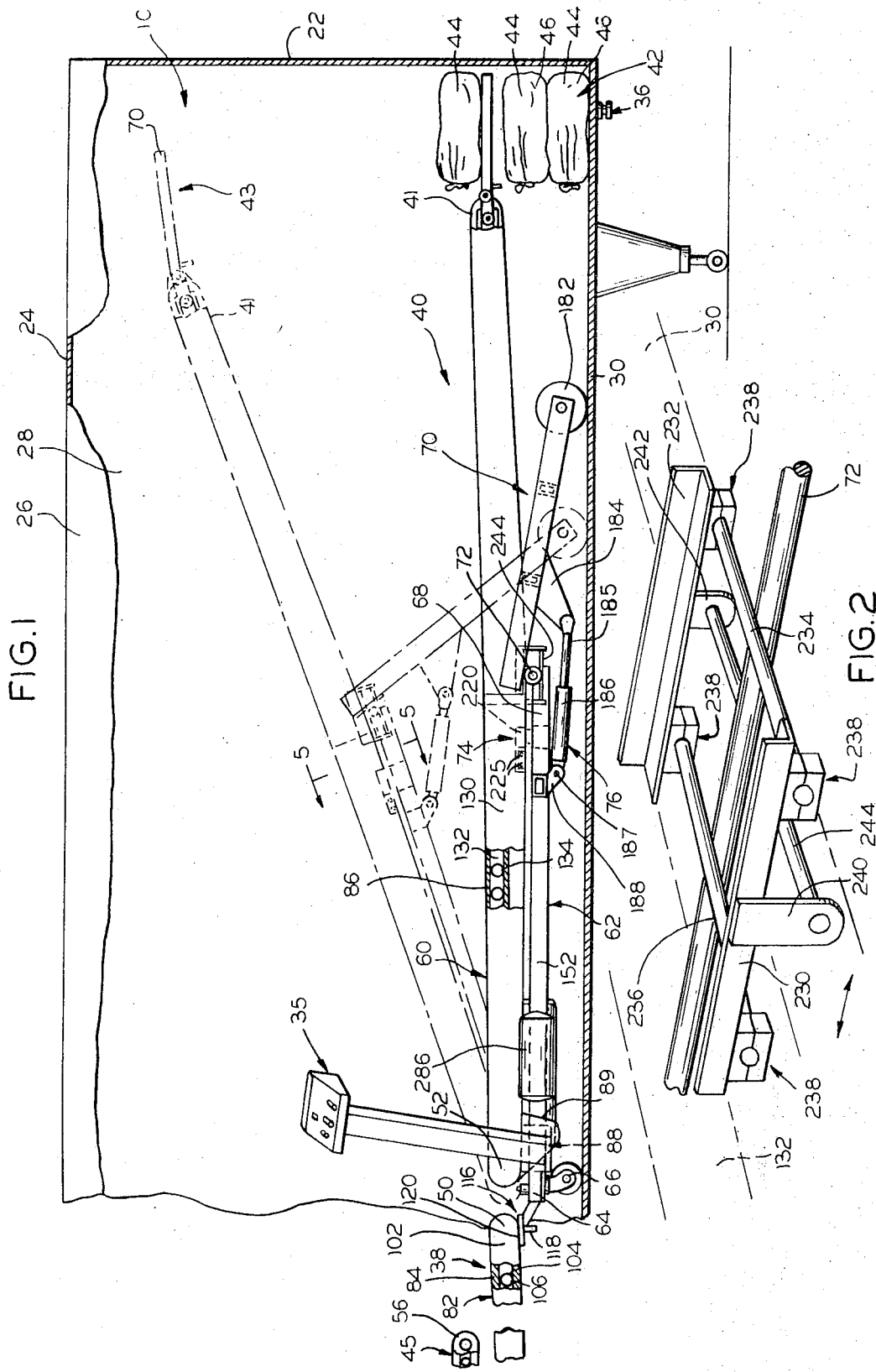

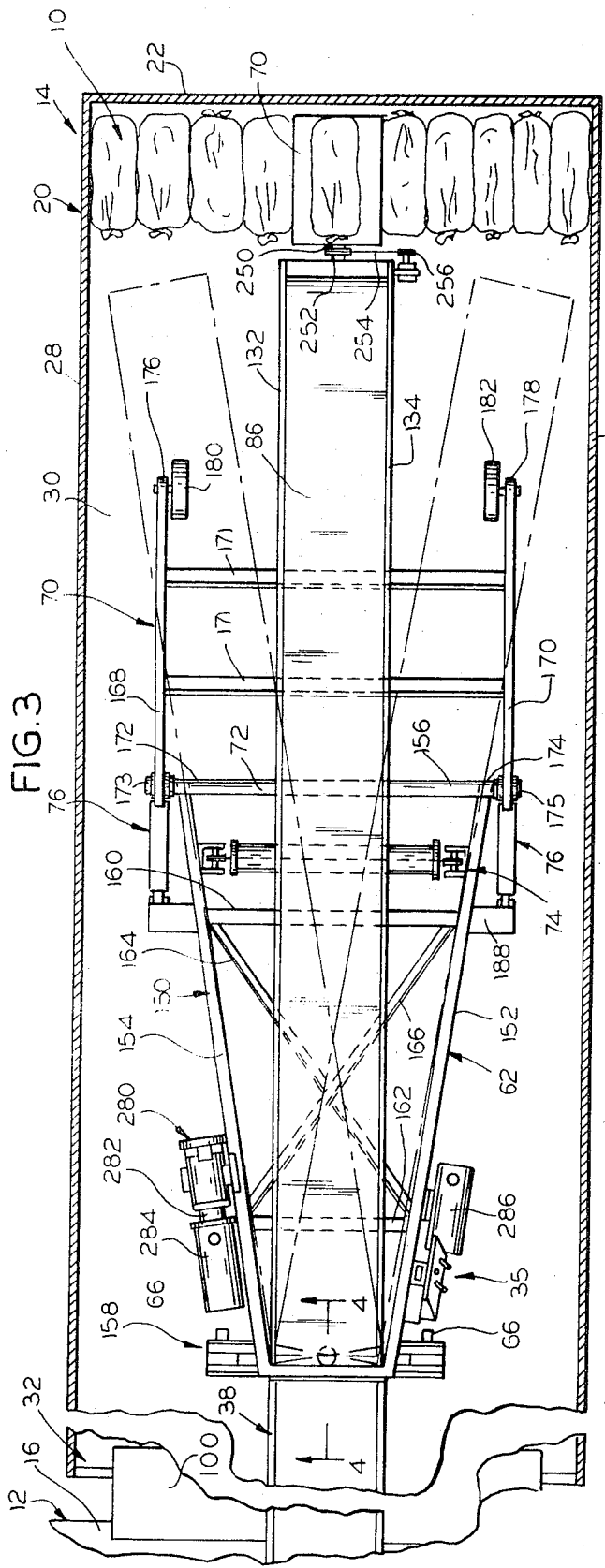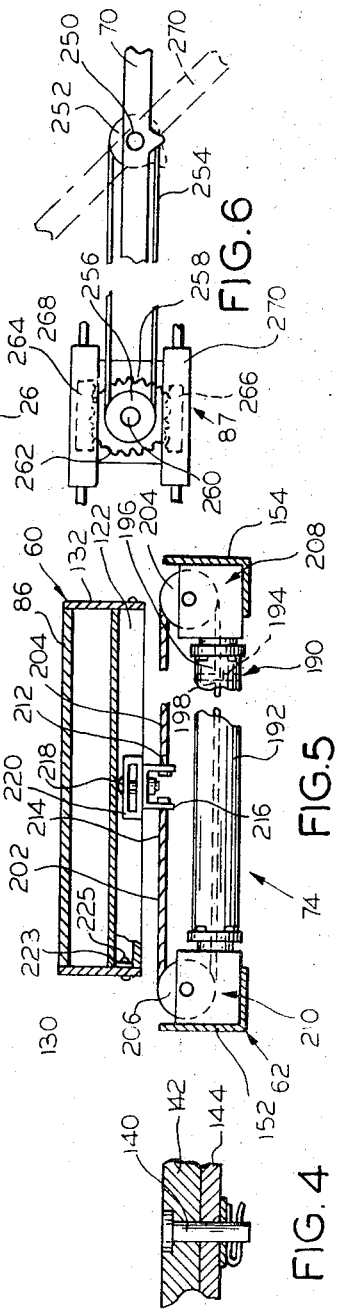

METHOD OF LOADING BAGGED MAIL FROM A LOADING DOCK INTO A HIGHWAY VEHICLE

This application is a division of my application Ser. No. 108,500, filed Jan. 21, 1971, now Pat. No. 3,717,263.

This invention relates to method and apparatus for loading mail bags into highway vehicles of the end loading type, and more specifically relates to improvements of the general type shown in my Pat. No. 3,507,411, granted Apr. 21, 1970.

Prior to the arrangements disclosed in my said patent, procedures for loading mail bags into highway vehicles have largely been manual in nature, with the workers involved dragging individual bags into the vehicle from a pile of bags on the adjacent loading dock, and then individually positioning and lifting the bag as necessary to form the vertical bag stacks within the vehicle that are conventional loading practice. At best, hand carts were some times employed to reduce some of the manual effort involved, but the handling required of each bag was still pretty much the same; in both cases, much repetition of bag oriented movements was required for each bag, which is wasteful of effort and inefficient in terms of time and cost of getting a job done. The result was that valuable equipment was unduly tied up to accommodate the slow loading procedures, and labor was in short supply as workers became increasingly reluctant to take on jobs involving such hard work.

Nevertheless, the Post Office Department and others concerned with the transport of loaded mail bags have continued to load something on the order of 50,000 trucks a day in the U.S.A. in this manner at a cost on the order of Eighteen Dollars a truck, which gives an indication of the magnitude of the problem.

In accordance with the inventions disclosed in my said patent, mail bags are oriented on the loading dock in the position they are to have in the vehicle, and then are mechanically moved into the vehicle and are stacked while maintaining such orientation, and with the operator not having to enter the vehicle loading area, or the bags not having to be palleted in groups to reduce individual bag handling.

The present invention relates to improvements, modifications, and simplifications in the basic arrangement of my said patent, whereby bags are mechanically moved single file from the loading dock into the vehicle down the middle of the vehicle and, in several forms of the present invention, may be so discharged as to form compact stacks to fill the vehicle. In a simplified form of the invention, the bags are dropped in random positions starting at the forward end of the vehicle and thereby piled throughout the vehicle length. In both instances, the bags are elevated and moved laterally of their path of movement through the vehicle to loading position, as required to do this.

A principal object of this invention is to provide a method for loading mail bags in end loading highway vehicles without requiring that the operator cart the bags into the vehicle or that the mail bags be palleted in groups to reduce individual handling.

Another principal object of this invention is to provide a method for loading bagged mail in transport vehicles in closely spaced relationship to the end that the available air space within the vehicle will be loaded to the maximum, and all manual motions ordinarily required to handle the bags within the vehicle are performed by mechanical means arranged to carry, elevate as necessary, and deposit the bags in the compact relationship necessary to maximize the pay load by substantially filling the available cubic loading space of the vehicle.

Another principal object of the invention is to provide a method for loading of end opening vehicles such as motor trucks and trailers which permits a single operator to efficiently load the entire transport vehicle without handling the bags once they are inside it.

Still other objects of the invention are to provide apparatus for loading bagged mail in transport vehicles that is adapted for full push button actuation and control, to provide methods and apparatus for handling bagged mail that permits easy and consistent handling of the mail bags as oriented for final positioning within the vehicle, and to provide mail bag handling apparatus that is economical of manufacture, convenient and reliable in use, and adapted for all conventional mail bag loading dock areas and vehicles or their equivalents.

In accordance with this invention, the mechanical bag handling apparatus involved comprises a wheeled conveyor assembly positioned on the loading dock for ready movement into and out of the vehicle and including at its forward end a conveyor section riding on a wheeled frame, in which the forward end of the conveyor section projects forwardly of the frame cantilever fashion and the forward end of the frame is supported by a swinging wheeled leg arranged to swing between sharp and slight angles relative to the frame to vary the elevation of the discharge or forward end of the conveyor section. The conveyor section is mounted on its frame for swinging movement sidewise of the frame about an axis at the rearward end of the section for varying the position of the conveyor section discharge end laterally of the conveyor. Power actuation devices are provided to selectively achieve the desired positioning of the conveyor section discharge end laterally and elevationally of the vehicle to insure adequate distribution of the load. Where stacking is desired, the conveyor section is equipped with a discharge device at its forward end to control the positioning of the bags for stacking.

Yet other objects, uses, and advantages will be obvious or become apparent from a consideration of the following detailed description and the application drawings.

IN THE DRAWINGS

FIG. 1 is a diagrammatic side elevational view of a semi-trailer in the process of being loaded in accordance with the present invention, with parts being broken away;

FIG. 2 is a diagrammatic perspective view of a slider bar support for the stacking conveyor of FIG. 1;

FIG. 3 is a plan view of the arrangement shown in FIG. 1, with the highway vehicle being shown in section to expose its interior and the mail bag loading apparatus operating within the vehicle;

FIG. 4 is a fragmental sectional view substantially along line 4—4 of FIG. 3;

FIG. 5 is a sectional view substantially along line 5—5 of FIG. 1;

FIG. 6 is a diagrammatic fragmental view substantially along line 6—6 of FIG. 3;

Figure 10:
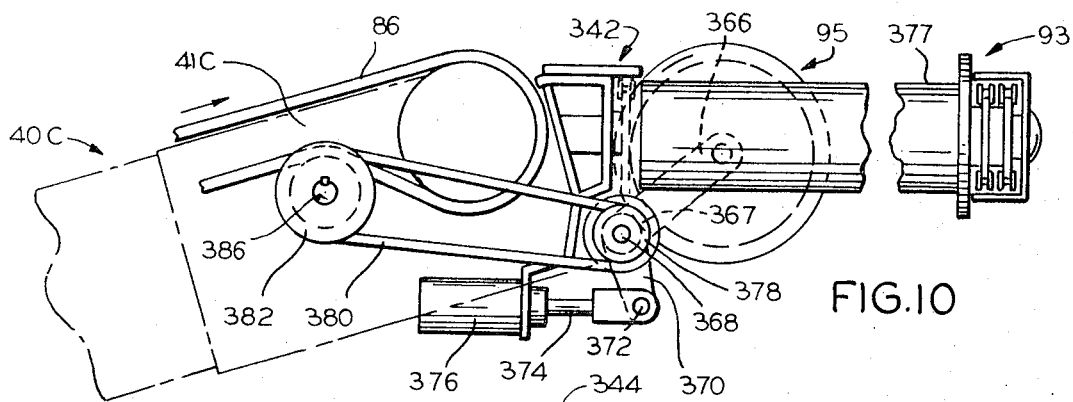
FIG. 10 is a view similar to that of FIG. 8 but showing another form of bag stacking device.
Figure 11:
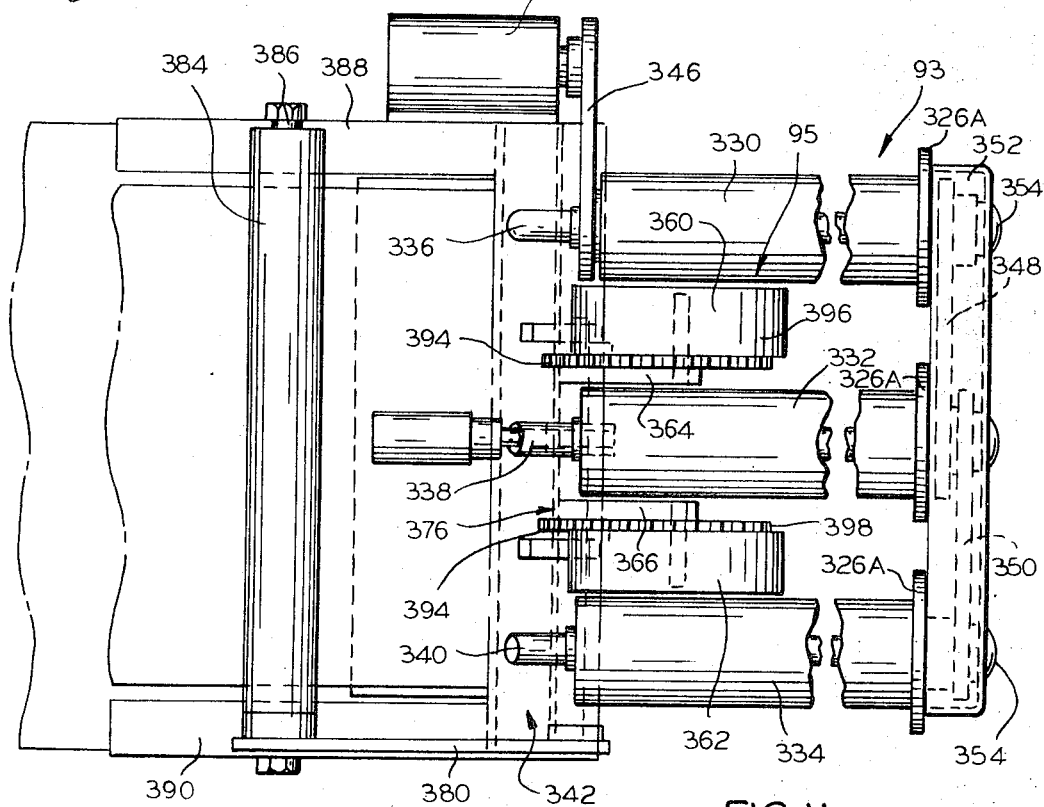
FIG. 11 is a top plan view of the structure shown in FIG. 10.
Figure 12:
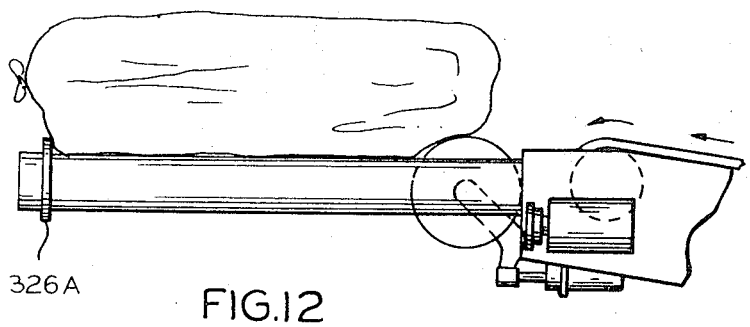
FIG. 12 is a diagrammatic side elevational view of the embodiment of FIGS. 10 and 11 but taken from the side opposite that of FIG. 10, and indicating the manner in which a bag is handled by the embodiment of FIGS. 10 and 11.
Figure 15:
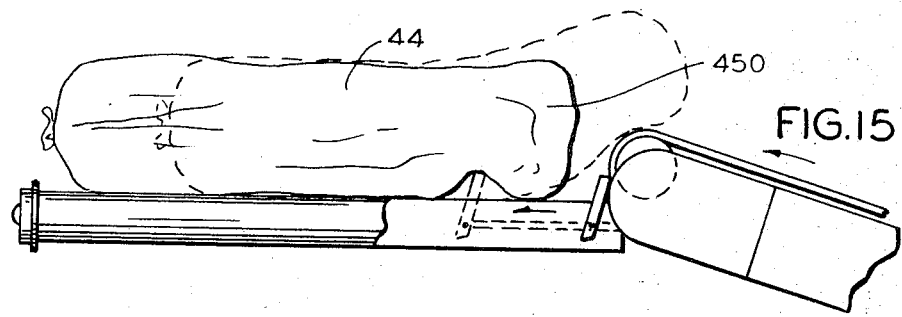
Figure 16:
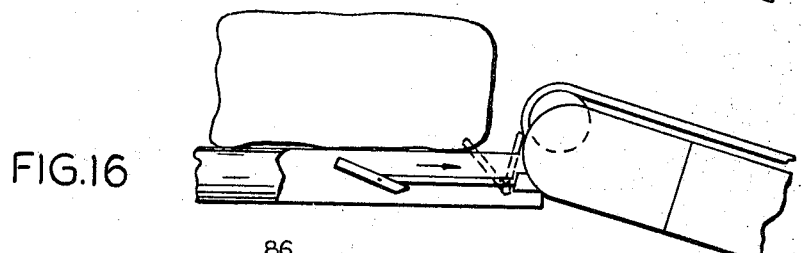
Figure 13:
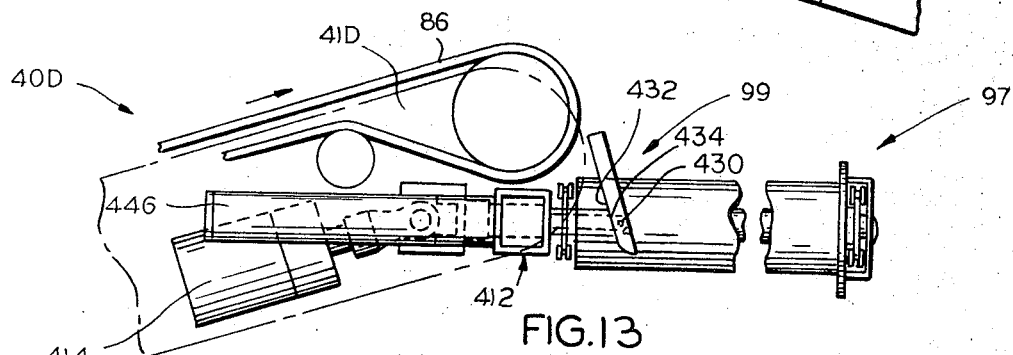
Figure 14:
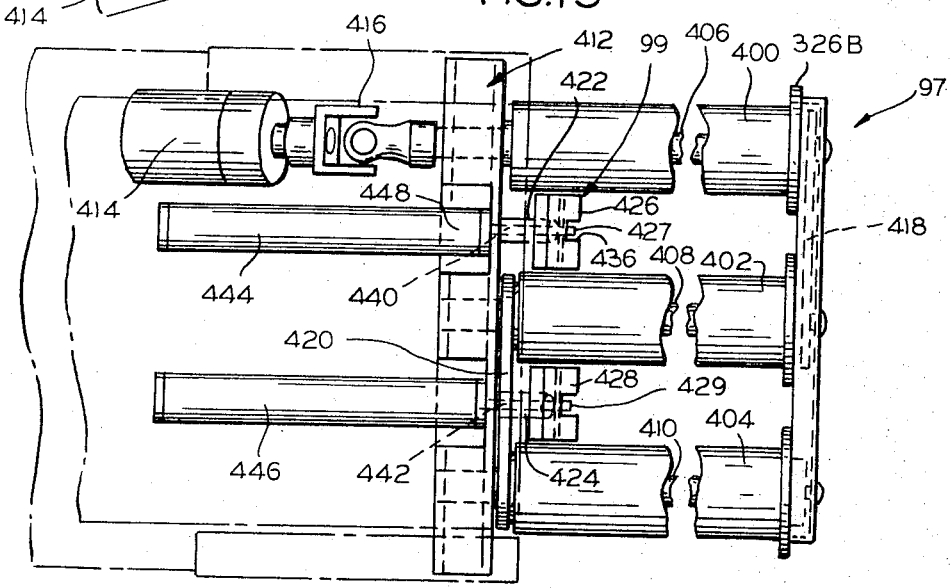

FIGS. 13 and 14 are similar to FIGS. 10 and 11, respectively, illustrating another embodiment of the invention; and FIGS. 15 and 16 are similar to FIG. 12 and illustrate the manner in which the bag unloading device of FIGS. 13 and 14 operates.

However, it is to be understood that the specific drawing illustrations provided are supplied primarily to comply with the requirements of the Patent Code, and that the invention is susceptible of other embodiments which are intended to be covered by the appended claims.

GENERAL DESCRIPTION

Reference numeral 10 of FIGS. 1 and 3 generally indicates one embodiment of the present invention, which is closely related to the basic approach of my said Pat. No. 3,507,411, for loading mail bags from a loading dock 12 into an end loading vehicle 14, which vehicle has been illustrated as being in the form of the familiar semi-trailer, although the invention is readily applicable to any end loading vehicle.

It is assumed that the mail bag handling installation involved includes the loading dock 12 (of a Post Office or the like), that is conveniently provided with a level load support surface 16 and the usual shoulder or end 18 adjacent to which the vehicle 14 is backed up for purposes of being loaded.

It is also assumed that the vehicle 14 is in the form of the usual body 20 defined by forward end wall 22, top wall 24, side walls 26 and 28, floor 30 and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown).

In accordance with this invention, there is associated with the loading dock 12 at the position 37 where the vehicle body is to be stationed for loading purposes, a mail bag receiving conveyor 38 and a mail bag stacking conveyor 40.

As indicated in FIG. 3, conveyors 38 and 40 are aligned longitudinally of the vehicle, and have a width to accommodate one mail bag oriented to extend longitudinally of the vehicle. Preferably, conveyors 38 and 40 operate in association with a conventional conveyor 45 of the type generally associated with Post Office facilities to convey mail bags to the loading dock 12.

Conveyor 38, and the conveyor 40 when horizOntally disposed, preferably are at an elevation about the loading dock surface 16 such that mail bags can readily be lifted onto the conveyor 38 from either side thereof, as well as being conveyed thereto from conveyor 45.

Conveyors 38 and 40 in the form shown are secured together in tandem at their respective ends 50 and 52, with the conveyor 38 being of sufficient length so that its rear end (not shown) will be disposed under the projecting end 56 of conveyor 45 when the forward end 41 of the conveyor 40 is positioned to load the first stack 42 of mail bags 44 at the front end 22 of the body 14.

The conveyor 40 comprises a conveyor frame or section 60 mounted on wheeled frame 62 which rides on the floor 30 of the body 14. The conveyor frame or section 62 at its rearward end 52 is swingably connected to the wheeled frame 62 so that its forward end 41 may be swung from side to side, as indicated in FIG. 3. The conveyor frame or section 60 projects forwardly of the frame 62 cantilever fashion as indicated in FIG. 1.

Wheeled frame 62 at its rearward end 64 rides on suitable casters 66, and at its forward end 68 has pivotally connected thereto a swinging support leg structure 70 movable between the positions indicated in FIG. 1 to elevationally position the end 41 of the conveyor 40 in accordance with this invention.

To accommodate the sidewise shifting movement of the conveyor frame or section 60, the conveyor frame or section 60 is slidably mounted on a slide bar 72 of frame 62 on which, in the form illustrated, leg structure 70 is journaled. The sidewise shifting movement of the frame or section 60 that is indicated in FIG. 3 is obtained by power actuation device 74 that is indicated in FIG. 5, while the upward angling of the conveyor frame or section 60 that is indicated in FIG. 1 is achieved by employing the pair of power actuation devices 76 that are interconnected between the frame 62 and leg structure 70 on either side of the conveyor 40.

In the form of the invention shown in FIGS. 1-6, the conveyor 40 is equipped at its end 41 with a mail bag discharging and stacking device 43.

Figure 7:
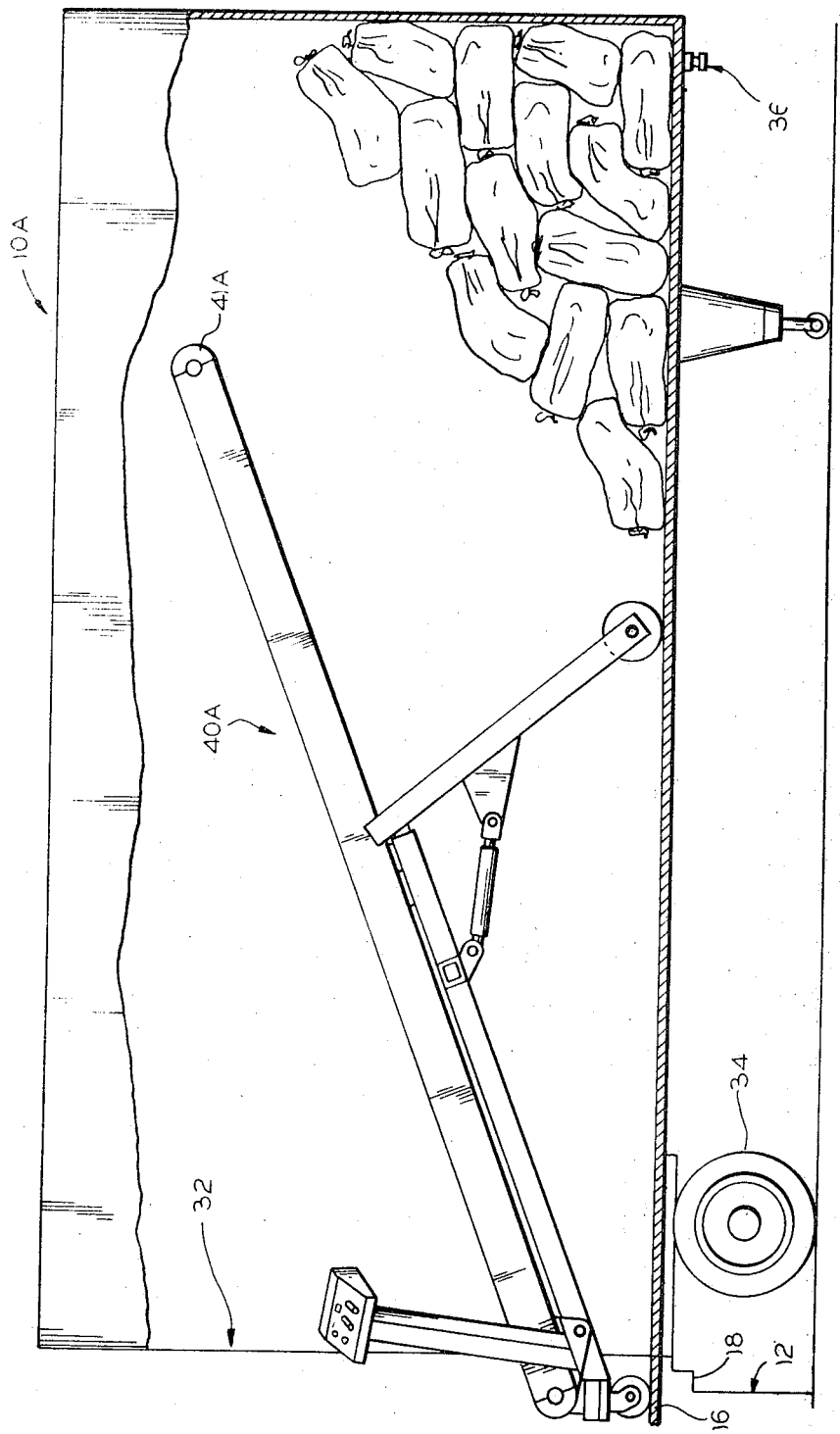
FIG. 7 is a view similar to that of FIG. 1, illustrating a simplified form of the invention that may be utilized when piling of the bags within the vehicle is acceptable.

In the simplified form 10A of FIG. 7, the discharging and stacking device 43 is omitted from the conveyor 40A, which is otherwise the same as conveyor 40.

The conveyor apparatus 38 is more specifically described in my copending application Ser. No. 72,428, filed Sept. 15, 1970, now Pat. No. 3,651,963, granted Mar. 28, 1972 but for purposes of the present application, it is sufficient to state that the conveyor apparatus 38 comprises frame 82 suitably supporting and training conveyor belt 84; the conveyor frame or section 60 of conveyor 40 suitably supports and trains its conveyor belt 86. The bag discharge device 43 comprises a platform 70 connected to the conveyor frame 60 in any suitable manner for tilting movement about an axis that extends generally longitudinally of same, and that is centered with the conveyor belt 86. Platform 70 may be tilted to one side or the other by power actuation device 87 (see FIG. 6).

Conveyor belt 84 of conveyor 38 is driven by a suitable drive (not shown) while conveyor belt 86 is driven by a suitable drive apparatus 88 that is protected by a suitable guard pan 89.

Preferably the loading dock 12 is arranged in such a manner that conveyors 38 and 40, when not in use, may be run back to the left under conveyor 45, with the conveyor 40 disposed in its substantially horizontal position and positioned under conveyor 45, so as to be in an out of the way position until needed. Conveyor 45 as illustrated is intended to represent conveyors of the conventional type utilized by the Post Office Department and other mail handling facilities, and is assumed to have a width comparable to conveyors 38 and 40 for conveying bags 44 when the bags extend longitudinally of the conveyor 45.

When the vehicle 14 is positioned in the manner indicated in FIGS. 1 and 3 for being loaded with mail bags, the conveyors 38 and 40 are run out to the right from under the conveyor 45 and moved within the vehicle body 20. The conveyors 38, 40 and 45, and the bag discharge device 43, are selectively put into operation by the operator operating controls built into a suitable control panel 35 associated with wheeled frame 62, it being a basic thesis of this invention that the conveyors 38 and 40 be arranged so that these pieces of apparatus are operated without anyone having to go into the vehicle 14 other than for the purpose of operating them from panel 13, and for this purpose the controls preferably are of the push button and/or control level type applied to the control panel 35 or its equivalent, and they may be of any suitable electric and/or electronic type that will serve the purpose.

Assuming conveyors 38, 40 and 45 are operating, and that the vehicle 14 is empty, the operator moves the tandem connected conveyors 38 and 40 approximately to the position shown in FIGS. 1 and 3 for stacking the mail bags 44 in vertical stacks 42 commencing at the front end wall 22 of the vehicle. As the individual bags 44 are deposited on conveyor 38 from the conveyor 45 (or are lifted onto the conveyor 38 from the side thereof and disposed to extend longitudinally of the conveyor 38 if no conveyor 45 exists or is not in use), the bags 44 are conveyed single file by the conveyor 38 longitudinally of vehicle 14 thence onto the conveyor 40, which moves them in the same manner onto the load discharge device 43. The operator standing at the control panel 35 positions the conveyor frame or section 60 relative to its wheeled frame 62 by operating power actuation device 74 to dispose the discharge apparatus 43 so that the first bag may be dropped off at one of the corners at the front end of the vehicle, for instance the lower right hand corner of FIG. 3. For putting down the first bag, the conveyor frame or section 60 may be at its lowermost position of operation that is illustrated in FIG. 1. When the conveyor frame or section 60 is disposed so that platform 70 may be tilted to drop the first bag 44 in the position indicated, power actuation device 87 is actuated by the operator to accomplish this, with the platform 70 tilting in the direction desired under the control of the operator and the bag sliding off the platform 70 onto the floor 30 of the vehicle.

The next bag 44 is handled in a similar manner, but deposited next to the first bag, conveyor section 60 being shifted toward the center of the vehicle 14 as required to achieve this positioning of the next bag. Subsequently bags are handled in like manner until the first row or tier 46 of the first stack 42 is laid down (the bag at the opposing corner of the vehicle being dropped into place by tilting the platform 70 in a reverse manner, with conveyor frame 60 positioned approximately in relation to the vehicle wall 28).

The next tier 46 is applied on top of the first tier by repeating the procedure described in connection with the first tier, except that the power actuation devices 76 are actuated to swing leg structure 70 sufficiently toward its position of FIG. 1 so that the next tier of bags 44 may be dropped into place without exceeding the 24 inch vertical drop specified by the Post Office.

Succeeding tiers 46 of the first stack 42 are completed in like manner, the frame or section 60 of conveyor 40 being raised, and the conveyor 40 being moved forward, as necessary to place the bags in their stack forming positions in the stack 42.

With the first stack 42 completed, the apparatus 10 is moved to the left of FIG. 1 sufficiently to start the next stack 42, and the loading operation is repeated to form the next stack 42. Subsequent stacks 42 are formed in like manner until stacks 42 are formed throughout the length of the vehicle 14, after which the vehicle open end is secured in the usual manner and driven off to be replaced by a similar vehicle that is located in a like manner.

The handling of the bags 44 in moving them from the conveyor 45 or loading dock 12 is thus carried out by the apparatus 10 after having made a single orientation of the bags as to the position it is to take longitudinally of the vehicle 14, and without having to drop the bag over the 24 inch limitation provided for by Post Office regulations.

In utilizing the embodiment 10A of FIG. 7, the bags 44 are brought into the vehicle in the same manner as described in connection with the apparatus 10, but instead of orderly stacks 42 being formed, the bags are piled in place by being dropped off one by one from discharge end 41A of the conveyor 40A, with the conveyor frame or section 60A being moved laterally of the vehicle at its end 41 to evenly distribute the bags across the width of the vehicle load receiving area. The piler apparatus 10A continues to unload bags while remaining in its forwardmost position within the vehicle 14 until the bags pile up underneath it in a triangular load configuration, up to the highest elevation achievable by employing the apparatus 10A, and then the apparatus 10A is gradually backed out of the vehicle 14 to completely fill the vehicle with bags in a random load positioning manner. In handling the apparatus 10A, the operator at control panel 35 positions the conveyor frame or section 60 laterally of the vehicle as required to obtain uniform distribution of the bags laterally of the vehicle; the end 41A of the conveyor 40 is positioned elevationally to insure that the bags do not have a vertical drop over the 24 inch distance specified by the Post Office Department.

While the conveyor 86 of conveyor 40A is shown to be of the single speed type, I also contemplate that conveyor 86 may be in the form of a multiple belt conveyor arrangement in which the belts are disposed in alignment longitudinally of frame 60A and run at increasing speeds to bring the bags up to a speed at the discharge end of conveyor 40A such that they are propelled or projected toward the vehicle body front end wall. For instance, three belt conveyors aligned end to end and moving at speeds of 200, 350 and 500 feet per minute, respectively, in the direction of discharge will provide the propelling action desired, and operation of this multispeed type conveyor permits initial formation of the bag load triangular configuration that is shown in FIG. 7 to form the basis for building up the bag load to the vehicle ceiling and lengthwise of the vehicle. In doing this, after the initial bag load configuration is formed, those bags in the rearward part of the bag load configuration form the base for building up the bag load to the ceiling, with additional bags being first applied to the rearward part of the bag load configuration to act as a retainer or dam that will hold in place following bags which are projected forwardly over those already in place as far as they will go. By adding to the bag load configuration rearwardly and upwardly, in a more or less alternate manner, the vehicle may be fully loaded, working rearwardly of the vehicle.

I also prefer that wheels 182 of the embodiments of FIGS. 1–7 be reversibly driven (hydraulically or otherwise) from control panel 35, so that the apparatus 10 and 10A may be conveniently moved longitudinally of the vehicle. For this purpose, the casters 66 should be suitably arranged for locking into position for straight line movement of the apparatus 10 and 10A longitudinally of the vehicle, when in the vehicle; casters 66 are released for maneuvering the apparatus 10 and 10A on the loading dock.

Figure 8:
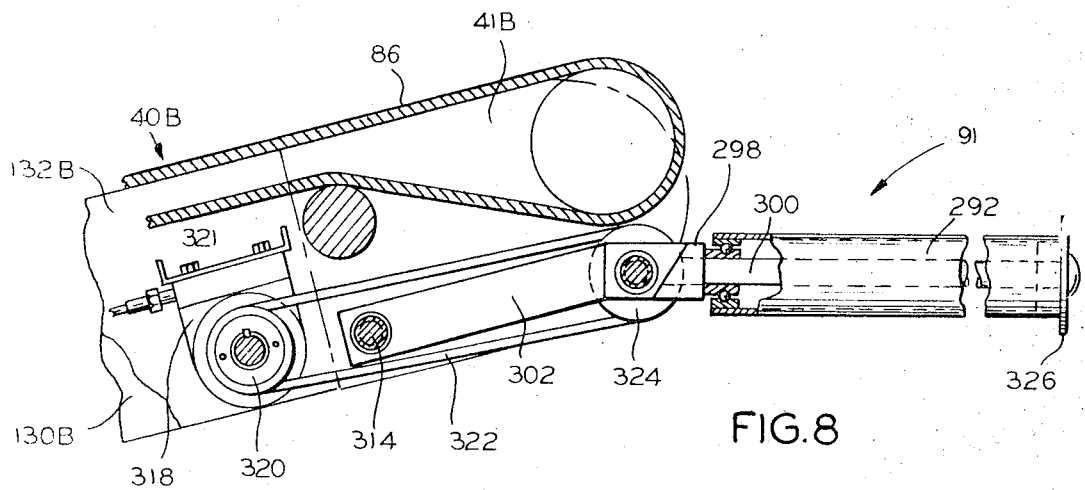
FIG. 8 is a fragmental side elevational view of the discharge end of a bag stacking conveyor shown equipped with another form of bag discharge device.
Figure 9:
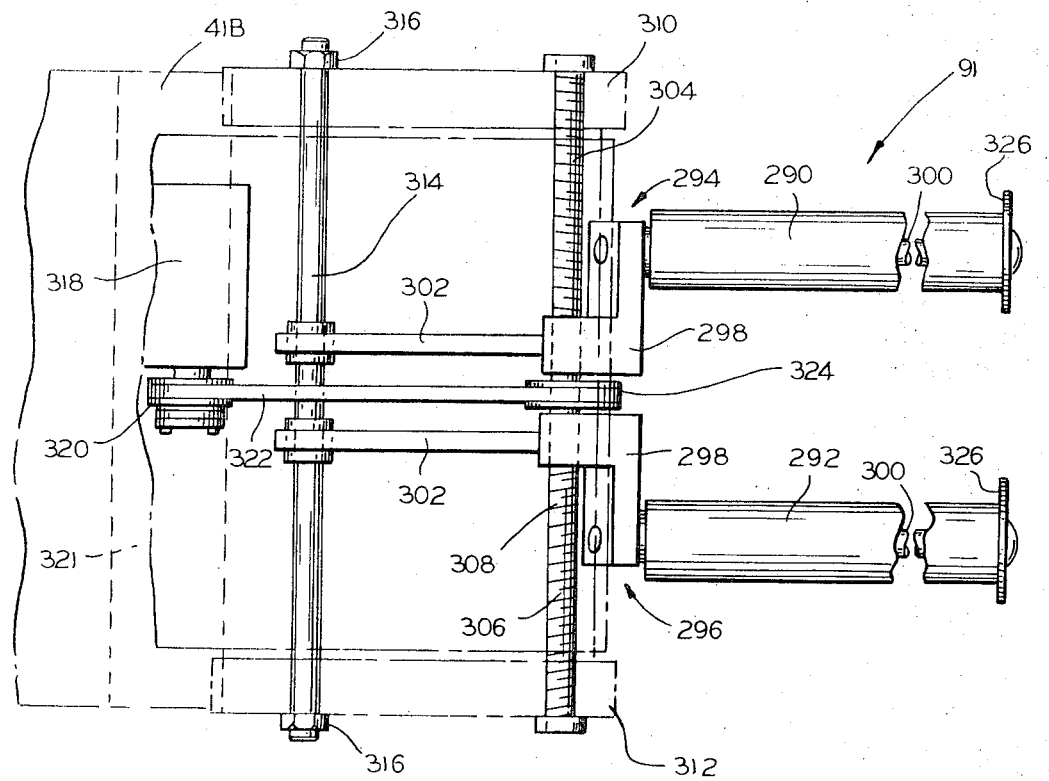
FIG. 9 is a top plan view of the structure shown in FIG. 8.

FIGS. 8 and 9 illustrate a driving roller type bag unloading device 91 at the discharge end 41B of the conveyor 40B to aid in bag stacking; FIGS. 10–12 illustrate another form of unloading device 93 that includes a bag advancer 95, while FIGS. 13–16 illustrate still a further unloading device 97 that includes a bag advancer 99. Advancers 95 and 99 insure that the individual bags are fully received on the respective unloading devices before discharge into their stack forming positions. Unloading devices 93 and 97 are arranged to convey the bags sidewise thereof for unloading purposes.

In some instances, it may be preferable to omit the conveyor 38 entirely and have a worker bring bags to the conveyor 40, utilizing a hand truck or the like. The worker then applies the bags to the conveyor 40 one at a time to achieve the loading distribution desired (depending on which form of the invention is employed, as for instance, the embodiment of FIG. 1, or the embodiment of FIG. 7). Where the vehicle 14 is of the type illustrated, this may involve the worker entering the vehicle to apply the bags to conveyor 40, because of the long vehicle lengths involved.

SPECIFIC DESCRIPTION

The loading dock 12 that is illustrated is intended to be representative of conventional loading docks now commonly associated with Post Office installations and the like. Suitable bridge plate 100 is employed to facilitate the running on and running off of the conveyors 38 and 40 in to and from the vehicle 14.

The vehicle 14 may be of any suitable standard type, that illustrated being intended to represent a typical vehicle now in use, though it is to be understood that the invention is equally applicable to other vehicles that are not of the semitrailer type.

Conveyor frame 82 of conveyor 38 generally comprises a pair of side plates 102 and 104 suitably joined together and journaling rollers 106 which support conveyor belt 84. Conveyor belt 84 at its ends is carried over suitable conventional end rollers (not shown) that rotate about horizontal axes. Conveyor 84 is driven in any suitable manner such as the drive apparatus described in my said application Ser. No. 72,428, and at its rear end the frame 82 rides on one or more suitable supporting wheels shown at 114 in my said application, and at its forward end 50 rests on a suitable support structure 116 carried by the wheeled frame 62 of the conveyor 40.

Support structure 116 in the form shown carries a rest plate 120 which is preferably formed to receive a pair of locating pins 118 suitably fixed to and disposed in spaced apart relation transversely of the frame 82 so that the frame 82 remains aligned with the conveyor 40 when the conveyors 38 and 40 are moved to the left of FIG. 1 and thus outwardly of the vehicle 14.

Where the conveyor 38 is not required, then the support structure 116 is eliminated.

Conveyor frame 60 of conveyor 40 comprises side frame members 130 and 132 suitably joined together and journaling rollers 134 that support the conveyor belt 86, the latter being trained over suitable end rollers journaled at the ends of the frame or section 60. Frame members 130 and 132 are suitably joined together to form a unitary frame structure which supports power drive 88 that may be of any suitable type, such as a suitable electric motor driving the end roller at end 52 of conveyor 40 through a suitable reducer, sprockets, and drive chain (not shown).

Frame 60 at its end 52 carries a suitable pivot pin 140 (see FIG. 4) extending through frame members 142 and 144 of the frame 60 and frame 62, respectively, for the purpose of pivotally connecting the frame 60 to the frame 62 for the pivotal movement that has been indicated. This pivotal movement is thus about an axis which is perpendicular to the plane of the frame or section 60 and located in substantial alignment with its longitudinal center line (see FIG. 3).

The wheeled frame 62 comprises a frame structure 150 including side frame members 152 and 154 joined together at the forward end 68 of the frame 62 by the slide bar 72, and joined together at the end 64 of the frame 62 by transverse beam structure 158 suitably journaling the casters 66. Side frame members 152 and 154 are also suitably interconnected by transverse members 160 and 162 and diagonal members 164 and 166 so as to form a rigid unitary structure.

The leg structure 70 generally comprises a pair of leg members 168 and 170 connected together by cross members 171 and suitably journaled on the respective end 172 and 174 of the bar 72 at the respective bearings 173 and 175. Members 168 and 170 have journaled on their respective ends 176 and 178 the respective supporting rollers 180 and 182. Each member 168 and 170 has affixed thereto intermediate the ends thereof a suitable bracket structure 184 to which the piston rods 185 of the respective devices 76 are pivotally connected, piston rods 185 being secured to suitable pistons reciprocably mounted in hydraulic cylinders 186 that are in turn pivotally connected as at 187 to bracket structures 188 that are in turn suitably affixed to the respective frame members 152 and 154.

As indicated in FIG. 1, when the power devices 76 are in their extended relation, frame 62 and the conveyor it supports is substantially horizontal, while when the devices 76 are in their contracted relation, the frames 60 and 62 have the upwardly inclined relation that is illustrated, the ends 176 and 178 of the respective leg members 168 and 170 in effect being pulled rearwardly of the conveyor 40 to raise its end 41 as desired for suitable placement of bags 44. Wheels 180 and 182 may be suitably powered to make apparatus 10 self propelled, but the non-driven form illustrated is suitable for most purposes and the apparatus 10 is sufficiently light so that it can be readily rolled about by the operator.

The power operated device 74 per se is commercially available and generally comprises (see FIG. 5) a hydraulic cylinder device 190 comprises a hydraulic cylinder 192 having reciprocably mounted therein a suitable piston 194 which has anchored to either side thereof the ends 196 and 198 of the respective cable lengths 200 and 202 which are respectively trained over the respective pulleys 204 and 206 that are respectively journaled in suitable mounting structures 208 and 210 suitably fixed to the respective frame members 152 and 154.

The other ends 212 and 214 are anchored to a U-shaped bracket member 216 that is fixed by bolt 218 to tube structure 220 that is in turn fixed to angle member 222 that is fixed between side frame members 130 and 132 of the conveyor frame 60. In the form shown, angle member 222 has a mounting plate 223 fixed to either end thereof, which plates 223 are secured to the respective frame members 130 and 132 by bolts 225 or the like.

By actuating the piston 194 to move longitudinally of hydraulic cylinder 192, conveyor frame or section 60 is actuated to move laterally of the wheeled frame 62 about pin 140 as a center and riding on the slide bar 72.

In the area of the slide bar 72, the frame 60 has secured between its frame members 130 and 132 a pair of angle members 230 and 232 (see FIG. 2) having fixed thereto a pair of spaced apart slider bars 234 and 236 which rest on top of the bar 72. Bars 234 and 236 are secured in place in any suitable manner, as by being applied to suitable mounting devices indicated at 238.

The angle members 230 and 232 also have respectively depending therefrom a pair of support plates 240 and 242 between which is mounted tie rod 244 that is disposed below the slide bar 272; rod 244 may be in sliding engagement with the bar 72, or spaced slightly therefrom, to keep the conveyor frame or section 60 from any substantial upward movement relative to the slide bar 72.

The bag discharge device 43 comprises a platform 70 that includes a central shaft member 250 suitably journaled at the end of the frame 60 for pivotal movement about the centrally located axis that has been indicated.

Power operated device 87 acts to rotate the shaft member 250, and consequently the platform 70, in the direction desired, through a sprocket 252 suitably keyed to the shaft 250 and having trained thereover chain 254 which is also trained over sprocket 256 suitably keyed to a disc 258 and is journaled for rotation about pin 260 and is toothed as at 262 for meshing engagement with the respective upper and lower slider bars 264 and 266 reciprocably mounted in suitable hydraulic cylinder devices 268 and 270 that are of a known commercial type suitable for the purposes indicated, whereby hydraulic liquid admitted to cylinders 268 and 270 acts to shift the members 264 and 266 in opposite directions to rotate disc member 258 and thus sprocket 256 whereby platform 270 may be tilted through sprocket 252.

The hydraulic liquid for operating the hydraulic devices 74, 76 and 87 may be supplied in any suitable manner, such as motor 280, driving pump 282 and drawing hydraulic liquid from suitable tank 284 and supplying same to the respective devices through suitable hydraulic conduiting which is not illustrated but is within the competance of those skilled in the art. Similarly, the return hydraulic conduiting is likewise not illustrated. In the showing of FIG. 3, the motor 280, pump 282 and tank 284 are suitably secured to wheeled frame 62, as is an auxiliary reservoir tank 286.

Control panel 35 in the form illustrated is suitably fixed to the wheeled frame 62 and positioned so that the operator may stand in front of same to operate the various power mechanisms described, including the conveyor belts 84 and 86, through suitable switch arms, push buttons or the like.

The specifics of the embodiment 10A of FIG. 7, except for the elimination of the discharge device 43, are the same as the embodiment 10.

As indicated in FIG. 1, the pivotal axis of platform 70 is not in exact alignment with the plane of the conveyor frame 60, but is at a slight angle thereto so that when the frame 60 is in its maximum upwardly inclined position of FIG. 1, there will be no tendency of the bags 44 to roll off same before the discharge operation of the platform 70.

Referring now to the bag unloading device 91 of FIGS. 8 and 9, device 91 comprises a pair of rollers 290 and 292 respectively journaled on the respective support members 294 and 296, each of which comprises a base element 298 having a support rod 300 extending outwardly from one side thereof on which the respective rollers 290 and 292 are journaled, and a guide rod 302 extending from the other side thereof. The base elements 298 are respectively threadably mounted on oppositely threaded portions 304 and 306 of threaded shafts 308 that is suitably journaled at its ends in the respective support plates 310 and 312 that are suitably secured to the end 41B of the conveyor 40B. The guide arms 302 are respectively slidably received over support bar 314 that has its ends fixed between the support plates 310 and 312, as by employing suitable nuts 316. Shaft 308 is reversably rotated by suitable motor 318 driving a suitable sheave 320 of a torque limiter type over which pulley 322 is trained for engagement with sheave 324 that is keyed to the shaft 308. Motor 308 is mounted on a suitable cross member 321 extending between the side plates 130B and 132B of conveyor 40B.

Rotation of the shaft 308 in one direction moves the rollers 290 and 292 away from each other, while rotation of shaft 308 in the other direction moves rollers 290 and 292 toward each other, and this may be done under the control of the operator through a suitable push button type control at control panel 35.

Rollers 290 and 292 are each provided with a disc or flange 326 at their outwardly projecting ends to serve as a stop for limiting movement of the bags longitudinally of the conveyor.

In operation, the rollers 290 and 292 when in their retracted positions of FIG. 9 are disposed to receive a bag 44 from the conveyor 40B and support same, until the end 41B of the conveyor 40B is disposed so that the bag as positioned on the rollers 290 and 292 will be disposed approximately above the location in the stack in which it is to be dropped. Thus, bag 44 moving along the conveyor 40B rides over the end 41B of the conveyor to engage the rollers 290 and 292, and then is pushed lengthwise of the rollers 290 and 292 by the action of belt 86 on the rear end of the bag until the bag in question is fully supported by the rollers 290 and 292. Stop flanges 326 serve to limit this forward movement of the bags.

After the conveyor 40B has been positioned to dispose the unloader device 91 above the spot where the bag is to be dropped within the vehicle (as judged by the operator standing at control panel 35) in forming a stack 42, motor 318 is actuated to rotate shaft 308 to separate rollers 290 and 292, whereby the bag drops between the rollers onto the vehicle floor or the bag or bags below it, as the case may be. The operator then reverses the action of motor 318 to bring the rollers 290 and 292 back to their positions of FIG. 9 for accepting another bag. Suitable automatic control means may be associated with device 91 to stop operation of motor 318 when the rollers 290 and 292 have reached their maximum positions of closeness and separatedness.

In the unloading device 93 of FIGS. 10-12, rollers 330, 332 and 334 are journaled on the respective supports 336, 338 and 340 having their supported ends suitably secured to support structure 342 that is fixed to the end 41C of conveyor 40C. The rollers 330, 332 and 334 are reversably driven by suitable motor 344 through suitable pulley belt 346 operatively engaging sheaves (not shown) keyed to the motor 344 and roller 330, respectively; the drive transmitted to roller 330 is transmitted to roller 332 through suitable pulley belt 348 trained over sheaves (not shown) respectively keyed to the rollers 330 and 332, respectively, while the drive transmitted to roller 332 is in turn transmitted to roller 334 by pulley belt 350 trained over suitable sheaves (not shown) keyed to the respective rollers 332 and 334. Pulley belts 348 and 350 are enclosed by a suitable housing 352 secured to the outwardly projecting ends of the support rods 336, 338 and 340 by suitable fasteners 354.

The rollers 330, 332 and 334 each include a stop disc or flange 326A that serve the same function as the stop disc or flange 326 of the embodiment of FIGS. 8 and 9.

The bag advancer device 95 comprises a pair of rollers 360 and 362 received in intermeshing relation with the rollers 330, 332 and 334 and journaled on the respective arms 364 and 366 of bell crank structure 367 that is in turn journaled on rotatable shaft 368 that is journaled for rotation in suitable bearings (not shown) at either side of the end 41C of conveyor 40C. Bell crank structure 368 also includes rock arm 370 that is pivotally secured as at 372 to the piston 374 of suitable hydraulic cylinder device 376 arranged to move the rollers 360 and 362 between their elevated positions of FIG. 10, wherein they project above the rollers 330, 332 and 334, to a retracted position wherein the rollers 360 and 362 will be below the level of plane 377 tangent with the tops of rollers 330, 332 and 334.

Shaft 368 has keyed thereto sheave 378 that is driven by pulley belt 380 in turn driven by sheave 382 that is keyed to roller 384 suitably journaled on cross shaft 386 fixed in position between suitable mounting plates 388 and 390 at the end 41C of conveyor 40C. Pulley 384, as indicated in FIG. 10, is in bend pulley relation with conveyor belt 86 so as to be driven thereby; the surface of the roller 384 may be suitably roughened for good traction characteristics.

Shaft 368 has keyed thereto the respective spur gears 392 and 394 (see FIG. 11) which are in meshing relation with the respective gears 396 and 398 that are respectively keyed to the respective rollers 360 and 362, with the result that the rollers 360 and 362 are constantly rotating so long as conveyor belt 86 is moving.

In operation, a bag 44 moves up conveyor 40C for application to unloading device 93, in the normal operating position of which the rollers 360 and 362 are in their positions of FIG. 10. As the belt 86 continues to move, the bag moves over the end 41C of conveyor 40C, over the support structure 342 and into engagement with the rollers 360 and 362 of advancing device 95. As the trailing end of the bag leaves the conveyor 86, the advancing device 95 continues to move the bag forwardly and longitudinally of the rollers 330, 332, and 334 until the bag stops just short of or engages the stop flanges 326A. The operator then positions the conveyor 40C to dispose the unloading device 93 to one side or the other of the position that the bag 44 in question is to have in the vehicle 14, whereupon hydraulic cylinder device 376 is operated to retract rollers 360 and 362, and motor 344 is energized to rotate rollers 330, 332 and 334 in the direction to move the bag off these rollers so that it will drop into the desired position on the bag stack that is being built up. After the bag has dropped into position, the hydraulic cylinder device 376 is operated to replace the rollers 360 and 362 in their positions of FIG. 10, and motor 344 is deenergized to stop rotation of the rollers 330, 332 and 334 of the device 93. Preferably, the controls for the hydraulic cylinder device 376 and motor 344 are operably associated with the control panel 35 so that a control lever when moved to one position will deenergize motor 344 and actuate hydraulic cylinder device 376 to raise the rollers of the advancing device 95 to the position of FIG. 10, and in an opposite position, the rollers of device 95 will be retracted and rotation of rollers 330, 332, and 334 can be started in the desired direction as selected by the operator through suitable controls.

In the embodiment of FIGS. 13-14, the bag unloading device 97 is generally similasr to device 93 and comprises rollers 400, 402 and 404 suitably journaled on the respective supports 406, 408 and 410 that are respectively anchored in suitable support structure 412 affixed at the end 41D of conveyor 40D. Rollers 400, 402 and 404 are driven similarly to the rollers of unloading device 93 by suitable drive motor 414 through universal joint 416 that is suitably coupled to roller 400, from which the drive is transmitted to roller 402 through suitable pulley belt 418 trained over suitable sheaves (not shown) suitably keyed to their respective rollers 400 and 402. The drive is transmitted to roller 404 through suitable pulley belts 420 trained over suitable sheaves (not shown) that are suitably keyed to the respective rollers 402 and 404. Rollers 400, 402 and 404 each include a stop flange 326B.

Interposed in intermeshing relation with and between the rollers 400, 402 and 404 are a pair of butterfly plate elements 426 and 428 that are respectively pivotally secured, where indicated at 430, the respective rods 427 and 429 extending through the respective heads 422 and 424, and each plate element 426 and 428 includes a flat or planar surface 432, which surfaces 432 are respectively adapted to rest against the respective surfaces 434 of the respective heads 422 and 424 when the butterfly plate elements 426 and 428 are in their positions of FIGS. 13 and 15. The elements 426 and 428 are slotted as at 436 to allow the pivoting movement that is illustrated in FIGS. 15 and 16, and which is now to be described.

The respective heads 422 and 424 are respectively affixed to the support structure 412, and rods 427 and 429 are respectively secured to the respective pistons 440 and 442 of the respective hydraulic cylinder devices 444 and 446, which are suitably secured at their rod ends 448 to the mounting structure 412.

In operation, when the parts are positioned as shown in FIG. 13 and in solid lines in FIG. 15, a bag moving up conveyor 40D rides over the end 41D thereof and passes onto the rollers 400, 402 and 404, whereupon the action of the conveyor 86 continues to advance the bag 44 toward the stop flanges 326B of the rollers 400, 402 and 404 until slippage occurs between the rear end 450 of the bag and the conveyor 86, all without the butterfly plate elements being involved. Hydraulic cylinder devices 444 and 446 are then simultaneously operated through a suitable control or the like at control panel 35 to move the respective rods 427 and 429 forwardly through heads 422 and 424 and bring the respective butterfly plate elements 426 and 428 into engagement with the end of the bag to move it longitudinally of the rollers 400, 402 and 404, in the manner suggested by FIG. 15. Thereupon, the action of the hydraulic cylinder device 444 and 446 is reversed to disengage and retract the respective butterfly plate elements 426 and 428 and return the rods 427 and 429 to their positions of FIG. 13, whereupon the respective butterfly plate elements 426 and 428 are repositioned to upright position by engagement with their respective heads 422 and 424, as indicated in FIG. 16. Motor 414 then may be actuated through suitable controls at the control panel 35 by the operator to drive the rollers 400, 402 and 404 in the direction to drop off the bag at its desired location, assuming end 41D of conveyor 40D is appropriately disposed for this purpose.

As in the case of the end loading device 93, it is preferred that the motor 414 be reversably driven so that the bags can be discharged from either side of the device 97.

Advancing devices 95 and 99 are provided to insure that the bags are completely transferred to therespective unloading devices 93 and 97. When the stacking conveyor is at or near its maximum angle of inclination, the action of gravity may so oppose the impetus provided by the conveyor 86 that the rear end of the bag may not completely leave the end 41 of the conveyor 40 (and their equivalents herein disclosed); in such a condition, the orientation that the bag has when applied to the bag unloading devices may be disturbed as the bag is dropped towards its designated position in the vehicle, with the result that the bag may be twisted out of its desired orientation that has been achieved by the application of the bag to conveyors 38 and 40. The advancing devices 95 and 99 insure that the desired clearance between the rear of the bag and the conveyor ends 41 is adequate to avoid interference with the bag when the bag is dropped from the unloading device employed in accordance with this invention.

When the stacking conveyor is in its lower or more flatly angled working positions, the operator may find that it is not necessary to actuate the bag advancing devices. The supporting rollers of discharge devices 91, 93 and 97 lie in planes that are below the plane of frame 60 the slight angle indicated for the same reason that corresponding device 43 is so angled (which angle is on the order of 15°).

In installations where the conveyor 40 (with or without one of its herein illustrated modifications) is associated with a conveyor 38 or its equivalent, only a single operator will be needed to both load the bags on the conveyors 38 and operate the conveyor 40 to deposit the bags in the vehicle 14. The apparatus 10 and its herein illustrated modifications can readily be controlled to avoid dropping the bags further than the 24 inch limitation prescribed by the Post Office Department. The conveyor belts 84 and 86 preferably operate at a speed on the order of 200 feet per minute.

Where operating space is at a minimum and structural simplicity is desired, the conveyor 38 is eliminated and the bags are loaded by hand on the conveyor frame 60. This may be done by the operator or an assistant bringing the bags to the rearward end 52 of the conveyor 40 and moving them by hand onto the conveyor 40. The resulting simplicity achieves the mechanical loading of the bags that is desired even though necessitating a minor amount of bag maneuvering within the vehicle that is being loaded.

Conveyors 38 and 40 (in the various forms illustrated) as combined provide an enlongate run back conveyor apparatus that has its forward end adjustable vertically and horizontally to position the individual bags as desired in the vehicle. Where uniform stacking of the bags is desired, one of the illustrated bag discharge devices is employed, but where equipment economies are such that random bag loading in the vehicle 14 can be tolerated, the embodiment of FIG. 7 will achieve full random loading of the vehicle.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A bulk mail handling method for loading elongated mail bags from a loading dock into the load receiving area of an end loading transport vehicle backed into load receiving position adjacent the dock to dispose its end opening to receive the bags, and having its load receiving area empty without workers on the dock handling the bags having to enter the vehicle, and without requiring that pallets be employed or remain with the bags after they are loaded into the vehicle, said method comprising:

mechanically conveying the bags, at a speed of about 200 feet per minute, one by one and free of any supporting pallet single file lengthwise of the vehicle load receiving area forwardly of the vehicle and to a spotting position short of the forward end of the load receiving area, consecutively accelerating the bags up to about 500 feet per minute and projecting the accelerated bags toward the vehicle forward end wall adjacent the lower portion of same and spotting them across the width of the vehicle load receiving area in superposed relation to form an initial bag load configuration extending longitudinally of the vehicle and piled up against the vehicle forward end wall lower portion, which configuration is generally triangular in section longitudinally of the vehicle, propelling further bags forwardly of the vehicle and consecutively spotting same across the width of the vehicle rearwardly of the bag load configuration to extend the bag load configuration rearwardly of the vehicle and build same up to act as a retainer for subsequent bags to be spotted at the forward end of the bag load configuration, then consecutively projecting succeeding bags at said accelerated speed across the bag load configuration extension and spotting same across the forward end of the bag load configuration to build up vertically the forward end of the bag load configuration, and alternately repeating said propelling and projecting steps to fill the vehicle load receiving area for the full length thereof and the depth of the vehicle working rearwardly of the vehicle.

* * * * *